(12) United States Patent
Stretch

(10) Patent No.: US 6,443,284 B1
(45) Date of Patent: Sep. 3, 2002

(54) TORSION BAR ISOLATOR

(75) Inventor: Dale A. Stretch, Novi, MI (US)

(73) Assignee: Eaton Corporation, Cleveland, OH (US)

( * ) Notice: Subject to any disclaimer, the term of this patent is extended or adjusted under 35 U.S.C. 154(b) by 22 days.

(21) Appl. No.: 09/705,596

(22) Filed: Nov. 2, 2000

(51) Int. Cl.$^7$ .............................. F16D 47/02; F16D 3/12
(52) U.S. Cl. .................. 192/70.17; 192/55.2; 192/207; 464/97
(58) Field of Search .............................. 192/55.2, 55.3, 192/55.61, 70.17, 30 V, 207, 212; 464/97

(56) References Cited

U.S. PATENT DOCUMENTS

| | | | | |
|---|---|---|---|---|
| 1,978,922 A | * | 10/1934 | Wemp | 192/55.3 |
| 2,507,999 A | * | 5/1950 | Schjolin | 464/97 |
| 2,776,556 A | * | 1/1957 | Gustafson et al. | 464/97 |
| 3,321,988 A | * | 5/1967 | Peras | 464/97 |
| 4,287,791 A | * | 9/1981 | Numazawa et al. | 464/97 |
| 4,677,868 A | | 7/1987 | Filkins | |
| 4,782,932 A | | 11/1988 | Janson | |
| 4,790,792 A | | 12/1988 | Bopp | |
| 4,989,713 A | | 2/1991 | Janson | |
| 5,033,323 A | | 7/1991 | Janson | |
| 5,697,847 A | | 12/1997 | Meyer | |

* cited by examiner

Primary Examiner—Richard M. Lorence
(74) Attorney, Agent, or Firm—Loren H. Uthoff, Jr.

(57) ABSTRACT

Disclosed herein is an apparatus and system for isolating torsional vibrations in a driveline having a friction torque device and a ratio-change transmission. The friction torque device includes a driven member having radially extending projections for coupling the friction torque device to a shaft. The apparatus comprises a rotatably supported input shaft having a first end, a second end and an inner bore. A plurality of projections are disposed adjacent to the first end of the input shaft for engaging the radially extending projections of a driven member. The apparatus further comprises a torsion bar having a torsional spring rate, where the torsion bar is at least partially disposed within the bore of the input shaft. The torsion bar has a first end and a second end, the second end of the torsion bar is coupled to the input shaft. A plurality of projections are disposed adjacent to the first end of the torsion bar for engaging the radially extending projections of a driven member of a friction torque device. A lash is present between the input shaft projections and the radially extending projections of a driven member to provide relative rotation of the torsion bar to the input shaft. The radially extending projections have a negligible lash with respect to the torsion bar projections and therefore rotate with the torsion bar and act as a rotational governing means with respect to rotation between the torsion bar and input shaft.

18 Claims, 4 Drawing Sheets

TORSION BAR ISOLATOR

FIELD OF THE INVENTION

The present invention relates to the field of torsional vibration isolation systems, and more specifically, to torsional vibration isolation systems incorporating a torsion bar to reduce the natural frequency of a drivetrain.

BACKGROUND OF THE INVENTION

Torsional vibrations are the rotational irregularities of a rotationally driven component. In a vehicle drivetrain, torsional vibrations are caused by the forces generated within a combustion engine by the combustion of gases during the periodic combustion process. Torsional vibrations of the second or third order which originate from the engine, as a result of the ignition frequency of four or six cylinder engines, respectively, are predominant in the vehicle driveline. Torsional vibrations not only emanate from the engine power pulses but also from torque spikes and from abrupt changes in driveline torque due to rapid engine acceleration and deceleration.

Torsional vibrations cause premature wear to driveline components as well as audible noise. In a conventional driveline, the flywheel, which is rigidly connected to the crankshaft, will generate high reaction forces on the crankshaft. Furthermore, torque irregularities from a periodic combustion engine adds additional stress in the form of high frequency torques to the transmission. Furthermore, when a manual transmission is in neutral, gear rattle occurs, which is also an audible event, due to the teeth of meshing gears lifting away from another and then striking each other as a result of high frequency torque fluctuations.

Along with gear rattle, order based responses from the second or third engine order may be passed through the drivetrain and into the body structure. This sound can be greatly amplified if the components forming the sound are excited at their resonant frequencies.

Torsional vibration issues are further compounded by efforts to improve vehicle efficiency. Reductions in vehicle size and weight as well as reductions in driveline component inertia, such as flywheel masses, as well as reductions in transmission oil viscosity have added to the existing torsional vibration challenges. Lower drivetrain inertia results in a higher natural frequency of the drivetrain. As the engine rotational speed passes through the drivetrain natural frequency, resonant frequency occurs. The input displacement of a system is amplified at resonant frequency.

It is well known in the art to incorporate torsional vibration damping mechanisms in a dry clutch. As rotation occurs, the energy storage means within the damper, typically coil springs, provide the rotational compliance between the rotating elements. Another component of the damper is hysteresis, which is provided by friction producing elements. The hysteresis cooperates with the energy storage component of the damper to remove energy from the system.

The prior art is replete with mechanisms of negating or mitigating both forms of gear rattle, body boom, and vehicle jerk. Such mechanisms are commonly incorporated in master clutch plates and, of late, in so called two mass flywheels. It is also known to incorporate a mechanism in a transmission countershaft to mitigate idle rattle.

In the prior art, various types of vehicle torsional damping mechanisms which both isolate and dampen torsional vibration have been devised with limited success. For example, master clutches used in combination with manual shift mechanical transmissions have long employed torsional damping mechanisms having spring isolators and mechanical friction damper devices disposed in parallel with one another to attenuate and dampen driveline torque changes and resulting torsional vibration. One such device is disclosed in U.S. Pat. No. 4,782,932, the disclosure of which is hereby expressly incorporated by reference. In this device, a torsional damping mechanism is adapted to be disposed between the engine and the attached transmission and includes a viscous damping device in parallel with a torque transmitting torsion spring bar. Also, another torsional damping assembly is disclosed in U.S. Pat. No. 4,790,792, the disclosure of which is hereby expressly incorporated by reference, which discloses a device having a torsion damping assembly, includes a spring in a viscous damper. The spring assembly is disposed in parallel to a dampening section where the spring is a torsion shaft and a plurality of circumferential grooves are used to supply viscous damping by the introduction of a viscous substance such as silicone injected between the gap formed between the grooves and a like number of engaging annular rings. Although the above mentioned devices are good vibration isolation mechanisms, they have a complex design that involves many elements, resulting in higher cost and a more complicated assembly process.

U.S. Pat. No. 4,677,868 discloses an idle rattle mechanism incorporated in a countershaft assembly of a gear-change manual transmission. The countershaft assembly includes a cluster gear having ratio gears fixed thereto, a driven or head gear journaled on the cluster gear, loosely intermeshed teeth fixed to the cluster gear and the driven gear to limit relative rotation therebetween, and a viscous liquid disposed between the teeth for damping engine idle torsional vibrations which cause idle or driven gear rattle. Although this device is a good idle rattle reduction mechanism, the device is gear ratio sensitive since it is located in the transmission and is therefor not effective for isolating driveline vibrations.

It is desirous to provide a simple torsional vibration isolator for a driveline. It is also desirous to have an apparatus or system that can be employed with friction torque devices found in the state of the art. It is further desirous to provide a torsional vibration isolator that may be incorporated in current production transmissions without modification to the assembly process of the transmission.

Therefore, there is a need in the art to provide an improved isolator for a driveline that may be employed with a conventional friction torque device and gear-change transmission, which is simple and may be fitted into an existing drivetrain.

SUMMARY OF THE INVENTION

The present invention provides an apparatus for isolating torsional vibrations in a driveline having a friction torque device and a ratio-change transmission, where the friction torque device includes a driven member having radially extending projections for coupling the friction torque device to a shaft. The apparatus comprises a rotatably supported input shaft having a first end, a second end and an inner bore. The input shaft has a plurality of projections disposed adjacent to the first end thereof for engaging the radially extending projections of a driven member of a friction torque device. The input shaft projections have a length and a width. The apparatus also comprises a torsion bar having a torsional spring rate. The torsion bar is at least partially disposed within the bore of the input shaft. The torsion bar has a first end and a second end, where the torsion bar has a plurality of projections disposed adjacent to the first end thereof for engaging the radially extending projections of a driven member of a friction torque device. The torsion bar projections have a length and a width. A second end of the torsion bar is coupled to the second end of the input shaft. The width of the torsion bar projections are greater than the width of the input shaft projections to provide a lash between the input shaft projections and the radially extending projections of a driven member to permit rotation of the torsion bar relative to the input shaft, whereby torsional vibrations are isolated. The torsion bar projections and input shaft projections are oriented to be in registration with the radially extending projections of a driven member.

Another feature of the present invention is the torsion bar projections and input shaft projections may be oriented to provide a lash in at least one rotational direction between the input shaft projections and the radially extending projections of a driven member.

Another feature of the present invention is that the torsion bar projections and input shaft projections may be splines.

Another feature of the present invention is that the input shaft may be orientated with the torsion bar to provide more forward lash than rearward lash.

In an alternate embodiment, a system for damping torsional vibrations in a vehicle driveline is disclosed, comprising a driving member having an axis of rotation, a cover coupled to the driving member for rotation therewith, a pressure plate coupled to the cover for rotation therewith, and a driven disk coupled to a torsion bar and an input shaft for rotation therewith. The driven disk is interposed between the driving member and the pressure plate. The driven disk has a plurality of radially extending projections. The input shaft is rotatably supported and has a first end, a second end and an inner bore. The input shaft has a plurality of projections disposed adjacent to the first end for engaging the radially extending projections of the driven member. The input shaft projections have a length and a width. The torsion bar has a torsional spring rate and is at least partially disposed within the bore of the input shaft. The torsion bar has a first end and a second end. The torsion bar has a plurality of projections disposed adjacent to the first end for engaging the radially extending projections of the driven member. The torsion bar projections have a length and a width. The second end of the torsion bar is coupled to the second end of the input shaft. The width of the torsion bar projections are greater than the width of the input shaft projections to provide a lash between the input shaft projections and the radially extending projections of the driven member to permit rotation of the torsion bar relative to the input shaft, whereby torsional vibrations are isolated.

Further objects, features and advantages of the present invention will become apparent to those skilled in the art from analysis of the following written description, the accompanying drawings and appended claims.

DETAILED DESCRIPTION OF THE PREFERRED EMBODIMENT

Figure 1:
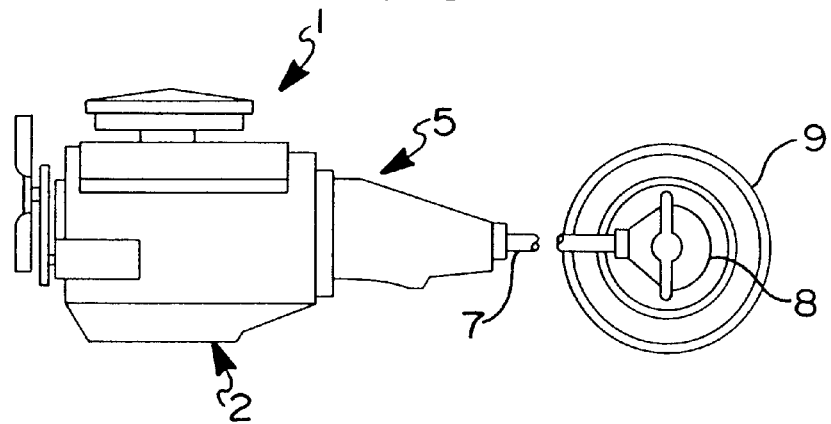
FIG. 1 is a schematic view of a motor vehicle driveline.

Referring now to FIG. 1, a schematic view of a vehicle driveline 1 is shown including an engine 2 and a transmission 5 having an output shaft 7 driving a differential gear assembly 8 for driving a ground engaging wheel 9. Disposed between the engine 2 and transmission 5 is a friction torque device 10, as shown in FIG. 2.

Figure 2:
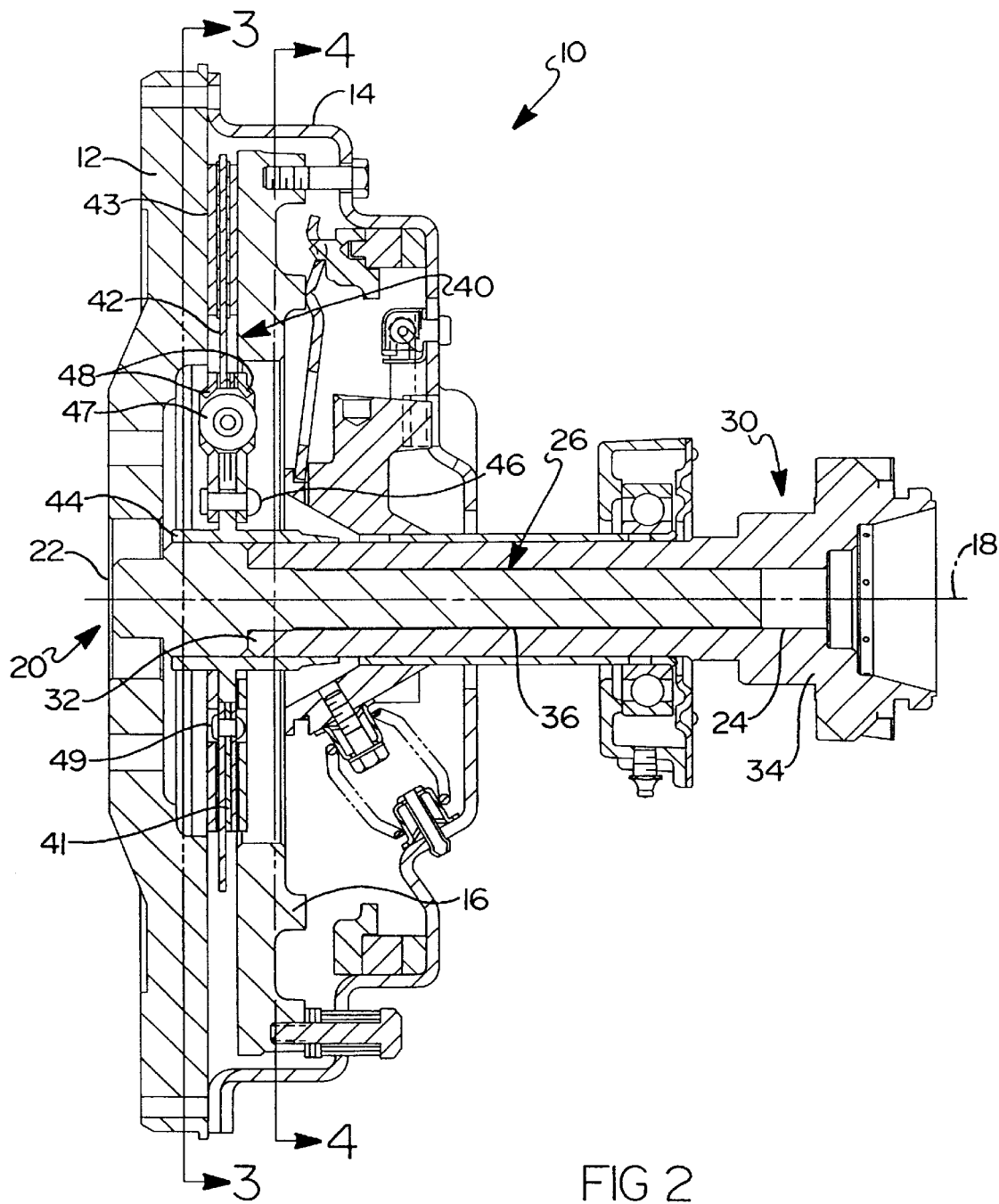
FIG. 2 is a cross-sectional view of a frictional torque device coupled to an apparatus for isolating torsional vibrations according to th principals of the present invention.

Referring now also to FIG. 2, a friction torque device 10 is shown having a driving member 12 with an axis of rotation 18, the driving member 12 is typically coupled to a rotating crankshaft of an engine 2. A cover 14 is coupled to the driving member 12 for rotation therewith. A pressure plate 16 is coupled to the cover 14 for rotation therewith. A driven disk 40 is interposed between the driving member 12 and the pressure plate 16. The driven disk 40 is coupled to a torsion bar 20 and an input shaft 30 for rotation therewith.

The input shaft 30 has a first end 32 and a second 34. The input shaft 30 is rotatably supported within the transmission 5 at the second end 34 by a bearing (not shown) or any other suitable means known in the art. The input shaft 30 also has an inner bore 36.

The torsion bar 20 has a torsional spring rate and is at least partially disposed within the bore 36 of the input shaft 30. The torsion bar has a first end 22 and a second end 24. The second end 24 of the torsion bar 20 is coupled to the second end 34 of the input shaft 30 by any means known in the art including, but not limited to, splines, welds, threaded fasteners or an interference fit. The torsion bar 20 is provided to rotate relative to the input shaft 30 as a function of torque applied to the torsion bar 20.

Driven disk 40 includes a disk plate 42 having a plurality of friction pads 43 attached thereto for frictional engagement with pressure plate 16 and driving member 12. A hub 44 is fixably attached to a pair of spring covers 48 by a plurality of rivets 46. It should become apparent to those skilled in the art that any suitable substitute may be employed in place of the rivets 46. Disk plate 42 is shown coupled to at least one reinforcing plate 41 by a plurality of rivets 49. Again, any suitable means known in the art may be substituted for rivets 49 to attach one or more reinforcing plates 41 to disk plate 42. Disk plate 42 is rotatable relative to hub 44. The relative rotation between disk plate 42 and hub 44 creates friction or, hysteresis, to dampen torsional vibrations. Energy storage means 47 are disposed between disk plate 42 and spring covers 48 to isolate torsional vibrations and govern the relative motion between hub 44 and disk plate 42. Although one example of a single plate friction torque device is shown, it is within the purview of the present invention to be employed in a variety of friction torque devices, including a two plate device.

Figure 3:
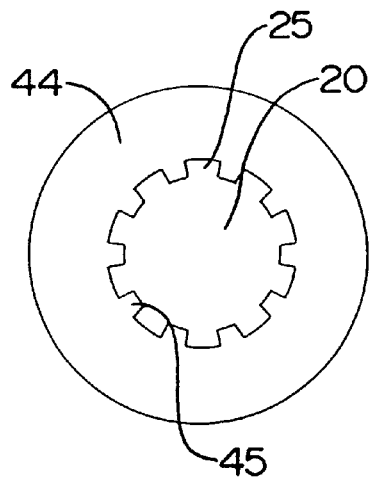
FIG. 3 is a sectional view taken along section 3—3 of FIG. 2.

Referring now to FIG. 3, a cross-sectional view taken along section 3—3 of FIG. 2 reveals a plurality of torsion bar projections 25 which are disposed adjacent to the first end 22 of torsion bar 20. The torsion bar projections 25 engage a plurality of radially extending projections 45 which in the present embodiment extend from hub 44. In the preferred embodiment, the torsion bar projections 25 are interdigitated with the radially extending projections 45 to provide a fit with negligible relative rotation between the torsion bar 20 and the hub 44.

Figure 4:
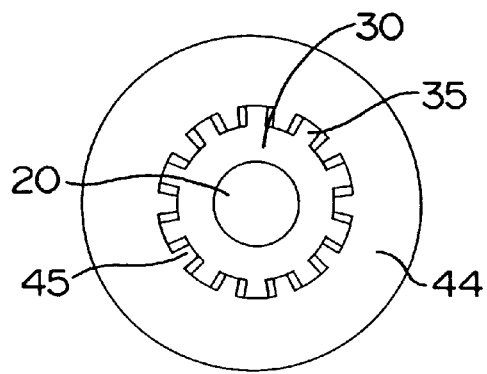
FIG. 4 is a sectional view taken along section 4—4 of FIG. 2.

Referring now also to FIG. 4, a cross-sectional view taken along section 4—4 of FIG. 2 reveals a plurality of projections 35 disposed adjacent to a first end 32 of the input shaft 30 for engaging the radially extending projections 45 of hub 44. As can be seen in FIG. 4, there is lost motion, or lash, between the input shaft projections 35 and radially extending projections 45 of hub 44. The lash between input shaft projections 36 and radially extending projections 45 allows for relative rotation between the driven member 40 and the input shaft 30, governed by the amount of lash present. Referring again now also to FIG. 3, there is negligible lash between torsion bar projections 25 and the radially extending projections 45 of driven member 40. The lash between the input shaft projections 35 and radially extending projections 45 allows the torsion bar 20 to rotate relative to the input shaft 30, effectively introducing a torsional spring into the driveline 1. The amount of relative rotation between the torsion bar 20 and the input shaft 30 is limited by the lash between the input shaft projections 35 and the radially extending projections 45 of the driven member 40. The first end 22 of the torsion bar 20 will rotate with hub 44 until the radially extending projections 45 contact the input shaft projections 35, reaching a rotational limit. It should be apparent to those skilled in the art that various elements may be substituted for hub 44 having radially extending projections for engaging torsion bar projections 25 or input shaft projections 35.

Figure 5:
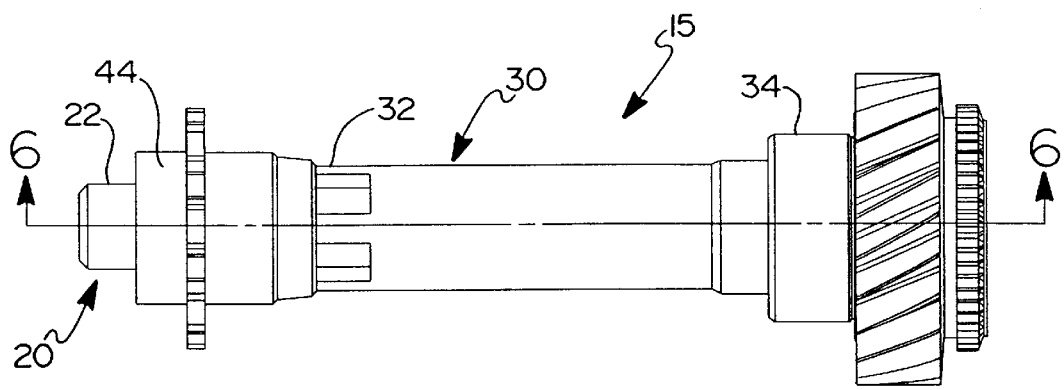
FIG. 5 is an illustration of an apparatus for isolating torsional vibrations according to the principals of the present invention.
Figure 6:
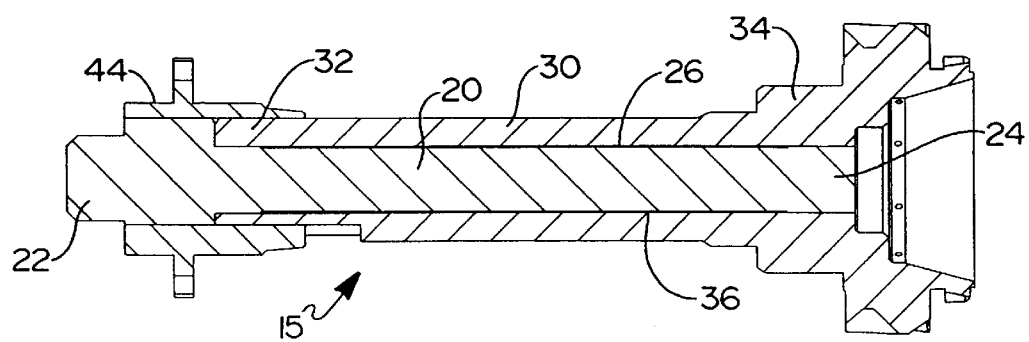
FIG. 6 is a cross-sectional view taken along section 6—6 of FIG. 5, revealing the operative elements therein.

Referring now to FIG. 5, an illustration of apparatus 15 of the present invention is shown including input shaft 30 and torsion bar 20 engagingly splined to hub 44. Referring now to FIG. 6., a cross-sectional view of apparatus 15 reveals the operative elements of the present invention. The input shaft 30 has a bore 36 through which torsion bar 20 is at least partially disposed. The torsion bar 20 has an outer diameter 26 which is less than the diameter of the bore 36 of input shaft 30 to provide rotational clearance therebetween. The hub 44 is shown in cooperation with input shaft 30 and torsion bar 20.

Figure 7:
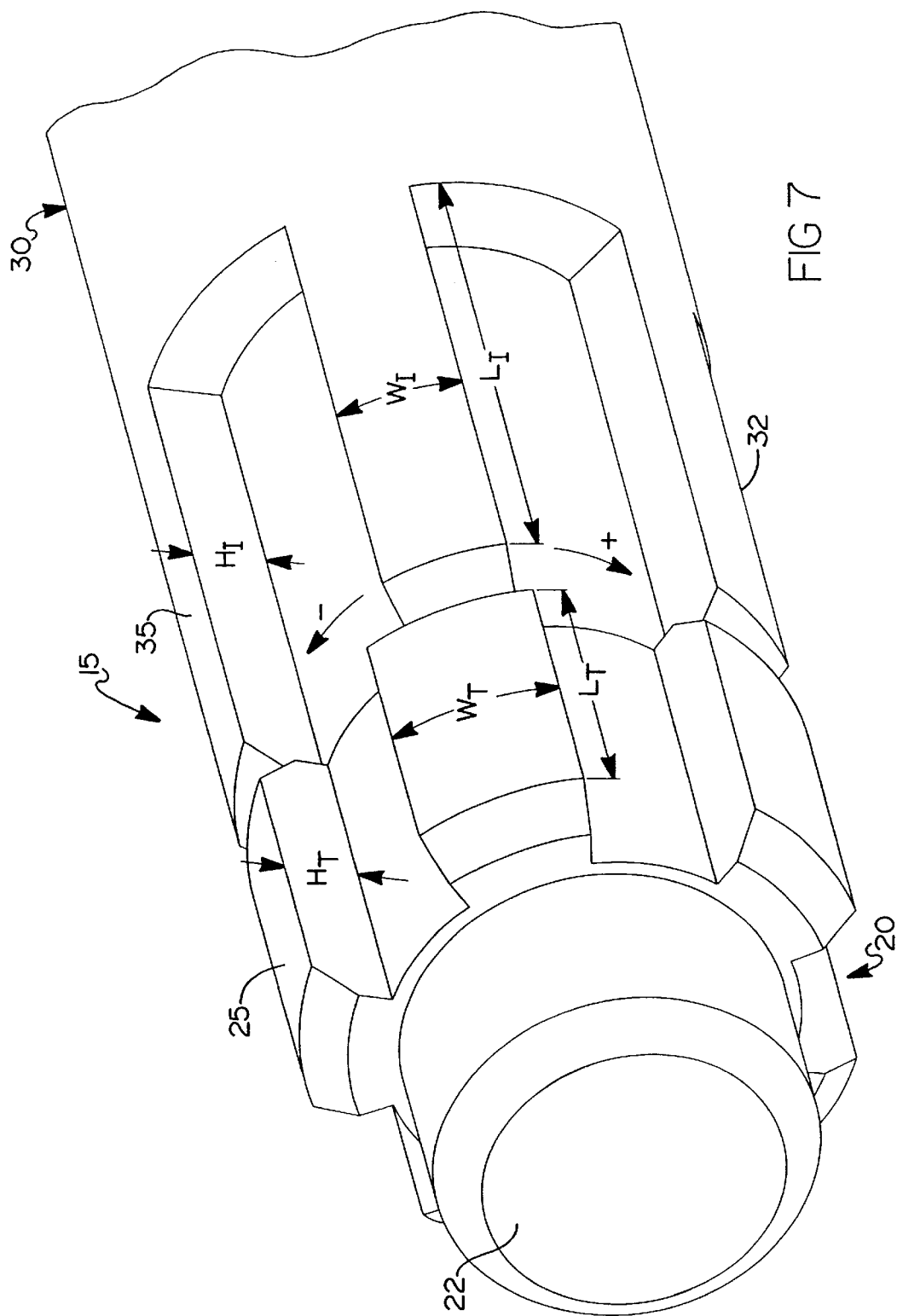
FIG. 7 is a partial perspective view of the apparatus of the present invention, revealing one possible orientation of the torsion bar projections with respect to the input shaft projections.

Referring now to FIG. 7, a perspective view of torsion bar 20 and input shaft 30 reveals the relationship between torsion bar projections 25 and input shaft projections 35. Torsion bar projections 25 have a length, indicated by $L_T$, a width, as indicated by $W_T$ and a height, as indicated by $H_T$. The input shaft projections 35 have a length, indicated by $L_I$, a width, indicated by $W_I$ and a height indicated by $H_I$. As can be seen in FIG. 7, the width of the torsion bar projections 25, as indicated by $W_T$ is greater than the width of the input shaft projections 35, as indicated by $W_I$. In the preferred embodiment, the input shaft projections height $H_I$ and torsion bar projections height $H_T$ are equivalent, although one skilled in the art would recognize that need not be the case.

The input shaft projections 35 and torsion bar projections 25 are oriented to be in registration with the radially extending projections 45 of the driven member 40. The torsion bar projections 25 and input shaft projections 35 are oriented to provide a lash in at least one rotational direction between the input shaft projections 35 and the radially extending projections 45 of the driven member 40. Forward lash, as used herein, is indicated by the plus sign ("+") and rearward lash is indicated by the minus sign ("−"). The torsion bar 20 may be disposed relative to the input shaft 30 so as to provide a forward lash, a rearward lash, or a combination of both forward and rearward lash. As an example, the input shaft 30 may be oriented with respect to the torsion bar 20 to provide approximately nine degrees of forward lash and approximately four degrees of rearward lash. The radially extending projections 45 of the driven member 40 may be continuous along the axis of rotation 18 or may be discontinuous so that a portion of the radially extending projections 45 that engage the torsion bar projections 25 are not in alignment with a portion of the radially extending projections 45 that engage the input shaft projections 35.

It should be appreciated by those skilled in the art, that an infinite variety of lash settings may be achieved by the present invention by varying the input shaft projection width $W_I$, the torsion bar projection width $W_T$ and the orientation of the input shaft projections 35 with respect to the torsion bar projections 25. Furthermore, a wide range of torsion spring rates are available by varying the length or diameter 26 of the torsion bar 20.

The foregoing discussion discloses and describes the preferred embodiment of the present invention. However, one skilled in the art will readily recognize from such discussion and from the accompanying drawings and claims that various changes, modifications and variations may be made therein without departing from the true spirit and fair scope of the invention as defined in the following claims.

What is claimed is:

1. An apparatus for isolating torsional vibrations in a driveline comprising:

a rotatably supported input shaft having a first end, a second end, and an inner bore, said input shaft having a plurality of projections disposed adjacent to said first end thereof, said projections for engaging the radially extending projections of a driven member of a friction torque device, said input shaft projections having a length and a width; and a torsion bar having a torsional spring rate, said torsion bar at least partially disposed within said bore of said input shaft, said torsion bar having a first end and a second end, said torsion bar having a plurality of projections disposed adjacent to said first end thereof, said projections for engaging the radially extending projections of a driven member of said friction torque device, said torsion bar projections having a length and width, said second end of said torsion bar coupled to said second end of said input shaft, said width of said torsion bar projections being greater than said width of said input shaft projections to provide a lash between said input shaft projections and the radially extending projections of said driven member to permit rotation of said first end of said torsion bar relative to said first end of said input shaft, whereby torsional vibrations are isolated.

2. The apparatus of claim 1, wherein said torsion bar projections and said input shaft projections are oriented to be in registration with said radially extending projections of said driven member.

3. The apparatus of claim 1, wherein said torsion bar projections and input shaft projections are splines.

4. The apparatus of claim 1, wherein said torsion bar projections are adjacent to said input shaft projections.

5. The apparatus of claim 1, wherein said lash is a forward lash.

6. The apparatus of claim 1, wherein said lash is a rearward lash.

7. The apparatus of claim 1, wherein said input shaft is oriented with said torsion bar to provide more forward lash than rearward lash.

8. The apparatus of claim 1, wherein said input shaft projections and torsion bar projection have a height, the height of said input shaft projections being equivalent to the height of said torsion bar projections.

9. A system for damping torsional vibrations in a vehicle driveline, comprising:

a friction torque device having a driving member with an axis of rotation, a cover coupled to said driving member for rotation therewith, a pressure plate coupled to said cover for rotation therewith, a driven disk interposed between said driving member and said pressure plate, said driven disk coupled to a torsion bar and an input shaft for rotation therewith, said driven disk having a plurality of radially extending projections;

said input shaft being rotatably supported and having a first end, a second end, and an inner bore, said input shaft having a plurality of projections disposed adjacent to said first end thereof, said projections for engaging the radially extending projections of said driven member, said input shaft projections having a length and a width; and said torsion bar having a torsional spring rate, said torsion bar at least partially disposed within said bore of said input shaft, said torsion bar having a first end and a second end, said torsion bar having a plurality of projections disposed adjacent to said first end thereof, said projections for engaging said radially extending projections of said driven member, said torsion bar projections having a length and width, said second end of said torsion bar coupled to said second end of said input shaft, said width of said torsion bar projections being greater than said width of said input shaft projections to provide a lash between said input shaft projections and said radially extending projections of said driven member to permit rotation of said first end of said torsion bar relative to said first end of said input shaft, whereby torsional vibrations are isolated.

10. The system of claim 9, wherein said torsion bar projections and said input shaft projections are oriented to be in registration with said radially extending projections of said driven member.

11. The system of claim 9, wherein said torsion bar projections and input shaft projections are splines.

12. The system of claim 9, wherein said driven member includes a torsional vibration damper.

13. The system of claim 9, wherein said driven disk includes a hub having said radially extending projections disposed thereon for engaging said torsion bar projections and said input shaft projections.

14. The system of claim 9, wherein said torsion bar projections are adjacent to said input shaft projections.

15. The system of claim 9, wherein said lash is a forward lash.

16. The system of claim 9, wherein said lash is a rearward lash.

17. The system of claim 9, wherein said input shaft is oriented with said torsion bar to provide more forward lash than rearward lash.

18. The system of claim 9, wherein said radially extending projections are continuous along the axis of rotation.

\* \* \* \* \*